US010102019B2

(12) United States Patent
Brophy

(10) Patent No.: US 10,102,019 B2
(45) Date of Patent: Oct. 16, 2018

(54) ANALYZING NETWORK TRAFFIC FOR LAYER-SPECIFIC CORRECTIVE ACTIONS IN A CLOUD COMPUTING ENVIRONMENT

(71) Applicant: Verizon Patent and Licensing Inc., Arlington, VA (US)

(72) Inventor: Timothy Brophy, Forest Hill, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 492 days.

(21) Appl. No.: 14/299,579

(22) Filed: Jun. 9, 2014

(65) Prior Publication Data

US 2015/0358205 A1 Dec. 10, 2015

(51) Int. Cl.
*G06F 15/16* (2006.01)
*G06F 9/455* (2018.01)
*H04L 29/06* (2006.01)
*H04L 29/08* (2006.01)

(52) U.S. Cl.
CPC ...... *G06F 9/45558* (2013.01); *H04L 63/0227* (2013.01); *H04L 63/1416* (2013.01); *H04L 67/10* (2013.01); *G06F 2009/45595* (2013.01)

(58) Field of Classification Search
CPC ....... G06F 2009/45595; G06F 9/45558; H04L 41/0816; H04L 43/0882; H04L 47/20; H04L 69/325
See application file for complete search history.

(56) References Cited

U.S. PATENT DOCUMENTS

| | | | | |
|---|---|---|---|---|
| 8,102,877 B1 * | 1/2012 | Liu | ...................... | H04L 47/782 370/255 |
| 9,015,319 B2 * | 4/2015 | Diachina | ............. | H04L 63/0263 709/225 |
| 9,021,310 B1 * | 4/2015 | McCabe | ............. | H04L 41/0659 714/43 |
| 9,325,739 B1 * | 4/2016 | Roth | ...................... | H04L 63/20 |
| 2005/0022010 A1 * | 1/2005 | Swander | ............. | H04L 63/0218 726/4 |
| 2007/0086336 A1 * | 4/2007 | Richards | ................. | C07F 17/00 370/229 |
| 2008/0282104 A1 * | 11/2008 | Khan | .................. | G06F 11/3608 714/2 |
| 2009/0138471 A1 * | 5/2009 | Zhang | ..................... | H04L 69/18 |
| 2010/0095367 A1 * | 4/2010 | Narayanaswamy | ......................... | H04L 63/0245 726/12 |

(Continued)

*Primary Examiner* — Hamza N Algibhah

(57) ABSTRACT

A device may receive information that identifies a set of rules for analyzing network traffic associated with a cloud computing environment. The device may receive network traffic information associated with the cloud computing environment. The network traffic information may be associated with network traffic transmitted to or transmitted from the cloud computing environment. The device may analyze the network traffic information using the set of rules, and may identify an action to be performed based on analyzing the network traffic information using the set of rules. The device may identify a layer of the cloud computing environment, at which to perform the action, based on analyzing the network traffic information using the set of rules. The device may cause the action to be performed to modify a configuration associated with the layer of the cloud computing environment.

20 Claims, 6 Drawing Sheets

(56) References Cited

U.S. PATENT DOCUMENTS

| | | | |
|---|---|---|---|
| 2011/0238855 A1* | 9/2011 | Korsunsky | G06F 21/55 709/231 |
| 2012/0136936 A1* | 5/2012 | Quintuna | G06F 21/604 709/204 |
| 2012/0281708 A1* | 11/2012 | Chauhan | H04L 63/0272 370/401 |
| 2013/0103827 A1* | 4/2013 | Dunlap | H04L 41/0816 709/224 |
| 2013/0212578 A1* | 8/2013 | Garg | H04L 43/0882 718/1 |
| 2013/0246588 A1* | 9/2013 | Borowicz | H04L 41/08 709/220 |
| 2014/0013434 A1* | 1/2014 | Ranum | H04L 63/145 726/24 |
| 2014/0071814 A1* | 3/2014 | Landscheidt | H04L 41/0816 370/229 |
| 2014/0108665 A1* | 4/2014 | Arora | H04L 67/141 709/227 |
| 2014/0157376 A1* | 6/2014 | Nambiar | H04L 47/122 726/5 |
| 2014/0173712 A1* | 6/2014 | Ferdinand | H04L 63/02 726/11 |
| 2014/0372788 A1* | 12/2014 | Vavrick | G06F 11/0793 714/4.1 |
| 2014/0373136 A1* | 12/2014 | Igelka | H04L 63/1441 726/22 |
| 2014/0380175 A1* | 12/2014 | Matczynski | H04L 41/5019 715/736 |
| 2015/0046574 A1* | 2/2015 | Celt, Jr. | H04L 41/5006 709/223 |
| 2015/0112915 A1* | 4/2015 | Michael | G06N 5/04 706/46 |
| 2015/0142947 A1* | 5/2015 | Dyba | H04L 41/0853 709/224 |
| 2015/0254090 A1* | 9/2015 | Mandava | G06F 9/45558 718/1 |
| 2015/0281279 A1* | 10/2015 | Smith | H04L 63/20 726/1 |
| 2015/0358118 A1* | 12/2015 | Krigslund | H04W 40/02 370/254 |
| 2016/0164893 A1* | 6/2016 | Levi | H04L 63/1416 726/23 |
| 2016/0216994 A1* | 7/2016 | Sefidcon | G06F 11/3495 |

* cited by examiner

ANALYZING NETWORK TRAFFIC FOR LAYER-SPECIFIC CORRECTIVE ACTIONS IN A CLOUD COMPUTING ENVIRONMENT

BACKGROUND

Cloud computing is the use of computing resources (e.g., hardware, software, storage, computing power, etc.) that are available from a remote location and accessible over a network, such as the Internet. Cloud computing environments deliver the computing resources as a service rather than as a product, whereby shared computing resources are provided to user devices (e.g., computers, smart phones, etc.). Customers may buy these computing resources and use the computing resources on an on-demand basis. Cloud computing environments provide services that do not require end-user knowledge of a physical location and configuration of a system that delivers the services.

DETAILED DESCRIPTION OF PREFERRED EMBODIMENTS

The following detailed description of example implementations refers to the accompanying drawings. The same reference numbers in different drawings may identify the same or similar elements.

A service provider may provide a cloud computing service to customers via a cloud computing environment. The service provider may want to monitor aspects of the cloud computing environment, such as network traffic associated with the cloud computing environment, and the cloud computing environment may be modified based on this monitoring, such as to improve a quality of service, to prevent malicious attacks, etc. However, the cloud computing environment may be complex, and may include different layers that may be modified to achieve a desired result. Implementations described herein assist a service provider in modifying a cloud computing environment at a specific layer based on monitoring network traffic associated with the cloud computing environment. In this way, the service provider may achieve fine-grained control of the cloud computing environment.

Figure 1:
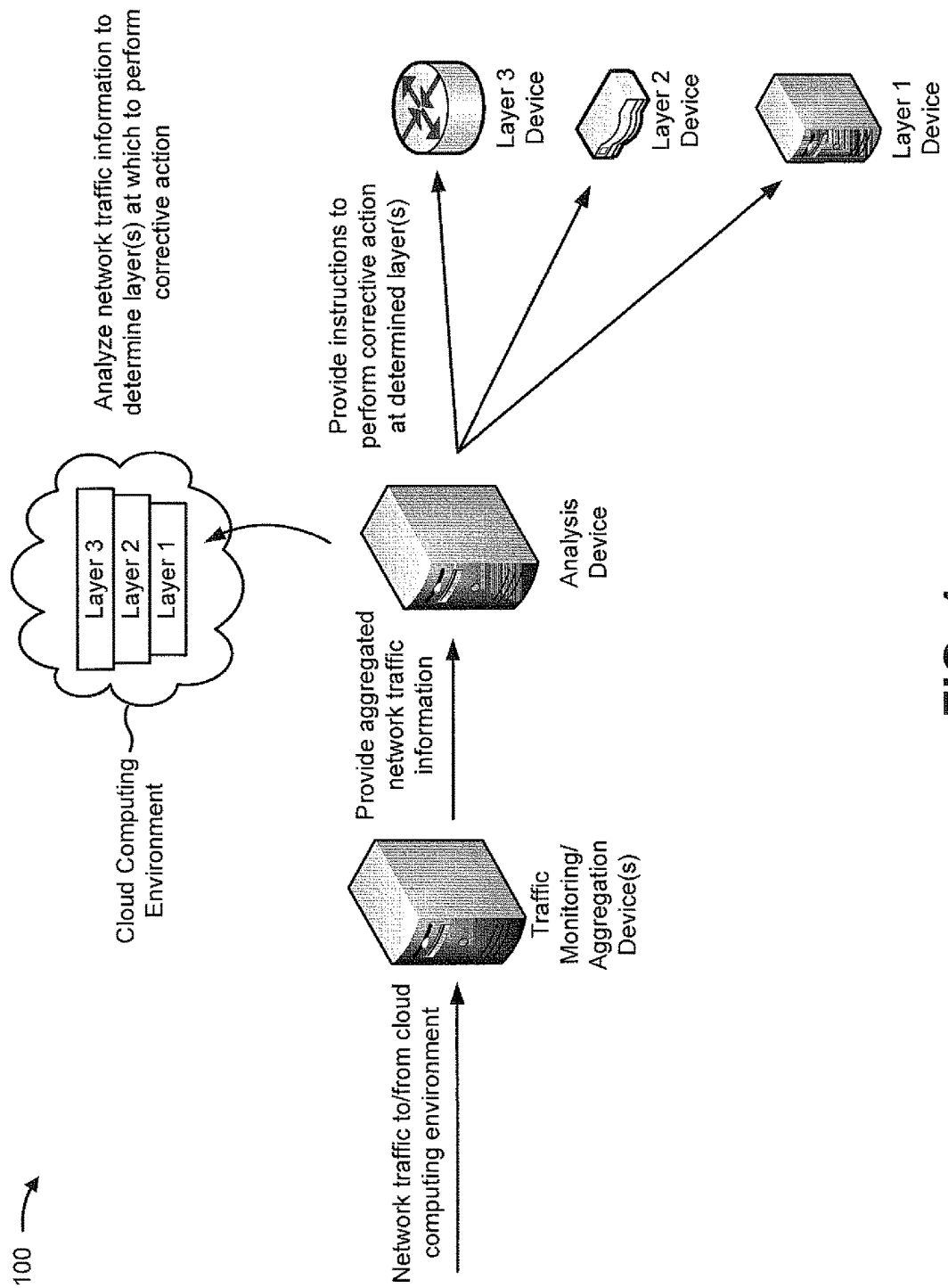
FIG. 1 is a diagram of an overview of an example implementation described herein.

FIG. 1 is a diagram of an overview of an example implementation 100 described herein. As shown in FIG. 1, assume that a traffic monitoring device and/or a traffic aggregation device receives network traffic associated with a cloud computing environment, such as network traffic destined for the cloud computing environment or network traffic transmitted from the cloud computing environment. Assume that one or more traffic monitoring devices monitor the network traffic, and that an aggregation device aggregates network traffic information monitored by the traffic monitoring devices. Further, assume that the aggregation device provides the aggregated network traffic information to an analysis device, as shown.

As further shown in FIG. 1, assume that the analysis device analyzes the network traffic information to determine one or more layers, associated with the cloud computing environment, at which to perform a corrective action. For example, the analysis device may apply a set of rules to the network traffic information, and may use the set of rules to determine a corrective action to perform at a single layer or multiple layers of the cloud computing environment. As further shown, assume that the analysis device provides instructions, to devices associated with the determined layer(s), that cause the devices to perform the corrective actions.

In this way, a service provider, associated with the cloud computing environment, may exercise fine-grained control over modifications to the cloud computing environment. For example, the analysis device may modify a specific configuration of the cloud computing environment so as to limit the impact of the modification when there are multiple customers that use the cloud computing environment (e.g., may limit modifications to fix a problem associated with a particular customer). Such fine-grained control may enhance the customer experience.

Figure 2:
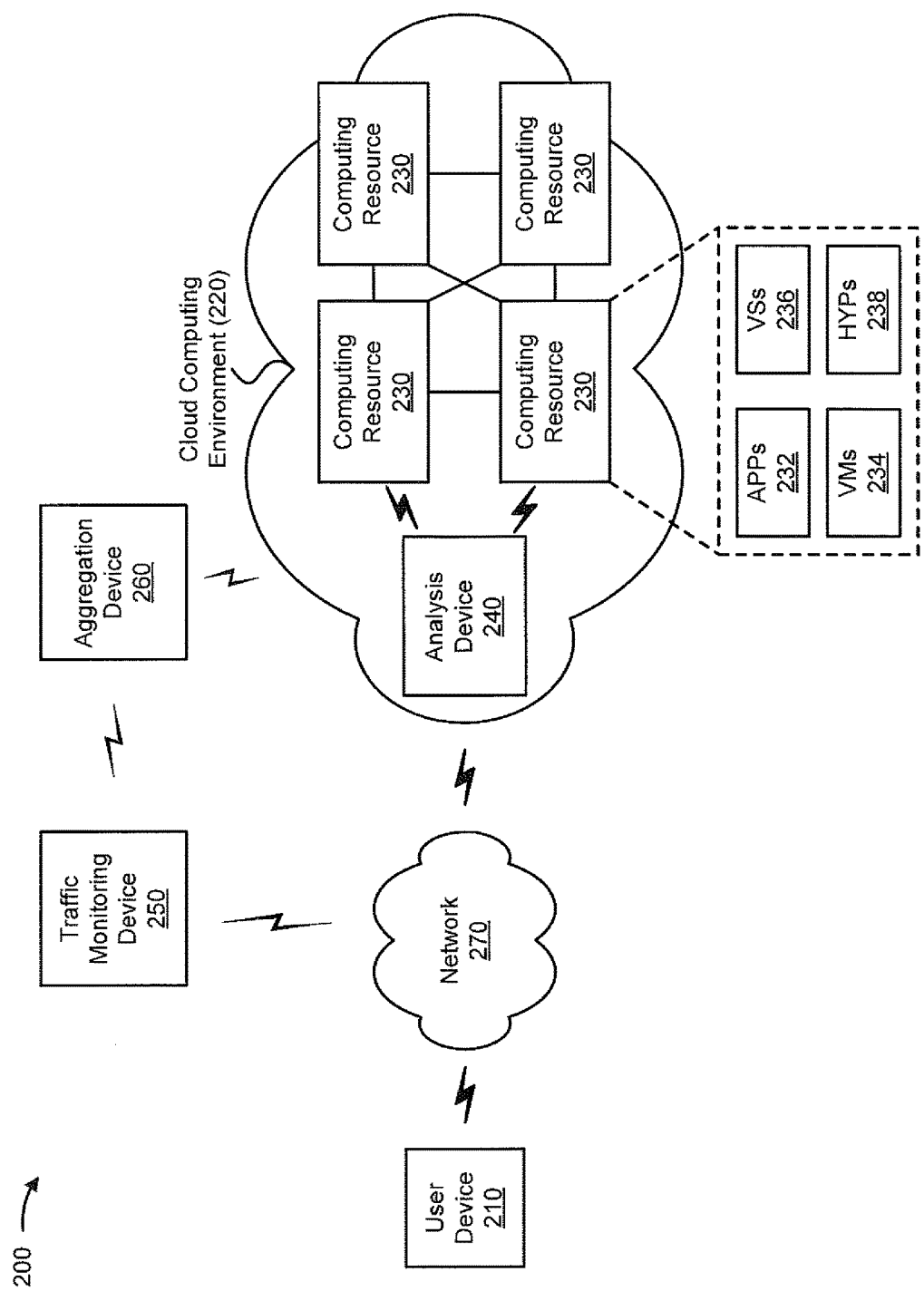
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210 interconnected with a cloud computing environment 220 via a network 270. As further shown, environment 200 may include a traffic monitoring device 250 and an aggregation device 260. Devices and/or components of environment 200 may interconnect via wired connections, wireless connections, or a combination of wired and wireless connections.

User device 210 may include one or more devices capable of communicating with cloud computing environment 220 via network 270. For example, user device 210 may include a laptop computer, a tablet computer, a desktop computer, a workstation computer, a smart phone, a personal digital assistant (PDA), a set-top box, a gaming device, or a similar device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as "computing resources 230" and individually as "computing resource 230") and an analysis device 240. In some implementations, cloud computing environment 220 may include traffic monitoring device 250 and/or aggregation device 260.

Computing resource 230 may include one or more personal computers, workstation computers, server devices, or other types of computation and communication devices. In some implementations, computing resource 230 may provide services to user device 210. Resources of cloud computing environment 220 may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VSs) 236, one or more hypervisors (HYPs) 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system ("OS"). A process virtual machine may execute a single program, and may support a single process. In some implementations, virtual machine 234 may execute on behalf of a user (e.g., user device 210), and may manage infrastructure of cloud computing environment 220, such as data management, synchronization, or long-duration data transfers.

Virtualized storage 236 may include one or more storage systems and/or one or more devices that use virtualization techniques within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service provided by cloud computing environment 220.

Analysis device 240 may include a device capable of analyzing network traffic associated with cloud computing environment 220 and/or one or more computing resources 230, and providing instructions, based on the analysis, to modify cloud computing environment 220 and/or one or more computing resources 230. For example, analysis device 240 may include a server device, a traffic transfer device, a gateway, a router, a modem, a switch, a firewall, a hub, a bridge, an intrusion detection device, a security device, a load balancer, and/or a similar device. While shown as being located external to computing resource 230, analysis device 240 may be may be implemented within one or more computing resources 230 and/or one or more components of computing resource 230 (e.g., application 232, virtual machine 234, virtualized storage 236, hypervisor 238, etc.). Alternatively, analysis device 240 may be included within one or more devices internal to and/or external from cloud computing environment 220.

Traffic monitoring device 250 may include one or more devices capable of monitoring network traffic associated with cloud computing environment 220. For example, traffic monitoring device 250 may include a server device, a packet inspection device, a traffic transfer device, a gateway, a router, a modem, a switch, a firewall, a hub, a bridge, an intrusion detection device, a security device, a load balancer, and/or a similar device. Communications may be routed through traffic monitoring device 250 to reach cloud computing environment 220. Additionally, or alternatively, communications may be duplicated and sent to both traffic monitoring device 250 and cloud computing environment 220. While shown as external from cloud computing environment 220, traffic monitoring device 250 may be located internal to cloud computing environment 220, in some implementations. Additionally, or alternatively, multiple traffic monitoring devices 250 may monitor network traffic, and may send network traffic information to aggregation device 260 to be aggregated and/or formatted.

Aggregation device 260 may include one or more devices capable of aggregating and/or formatting network traffic information received from one or more traffic monitoring devices 250. For example, aggregation device 260 may include a server device, a traffic transfer device, a gateway, a router, a modem, a switch, a firewall, a hub, a bridge, an intrusion detection device, a security device, a load balancer, and/or a similar device. Aggregation device 260 may receive network traffic information from one or more traffic monitoring devices 250, may format the network traffic information (e.g., such that received network traffic information is formatted using a same format), and may provide the formatted network traffic information to analysis device 240. Additionally, or alternatively, aggregation device 260 may aggregate network traffic information from multiple traffic monitoring devices 250, and may provide formatted or unformatted aggregated network traffic information to analysis device 240.

Network 270 may include one or more wired and/or wireless networks. For example, network 270 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
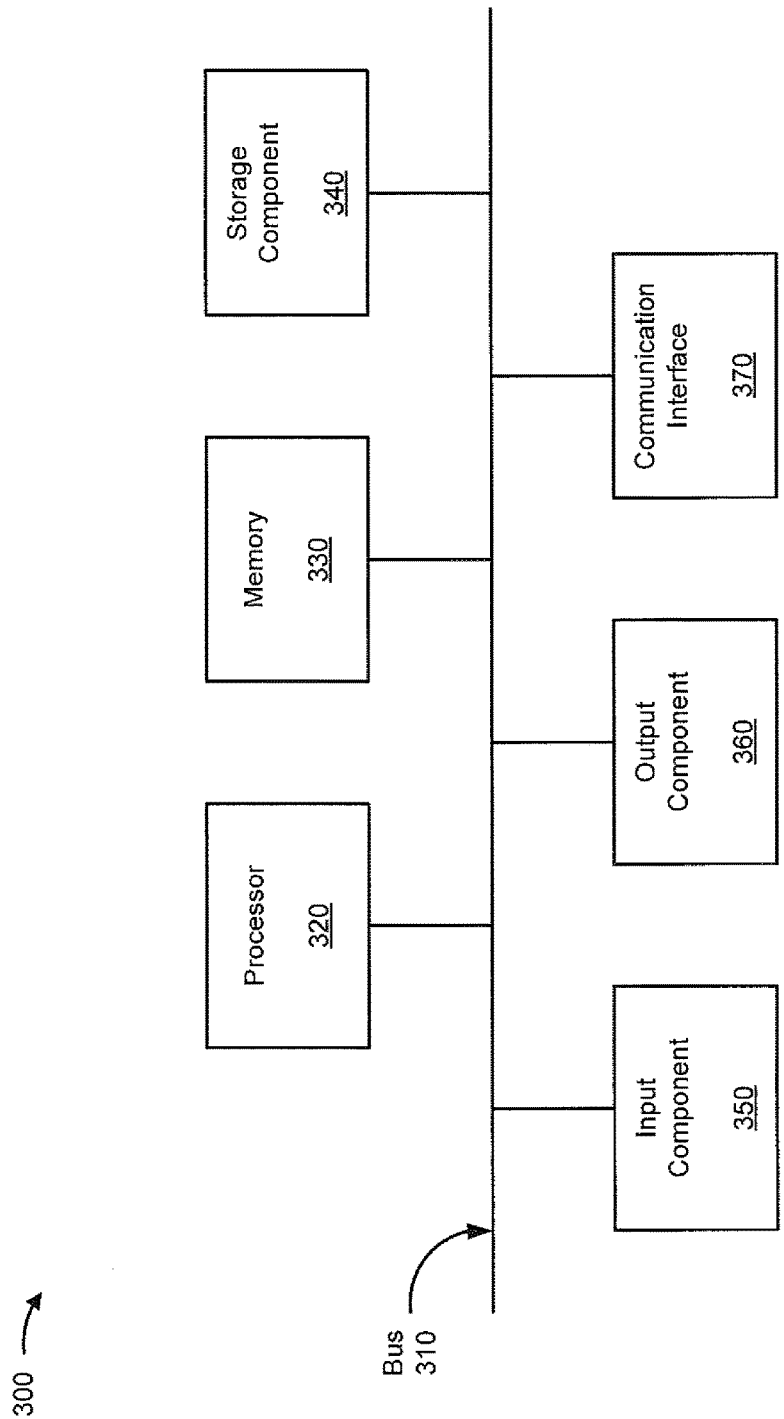
FIG. 3 is a diagram of example components of one or more devices of FIG. 2.

FIG. 3 is a diagram of example components of a device 300. Device 300 may correspond to one or more devices of FIG. 2. In some implementations, one or more devices of FIG. 2 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
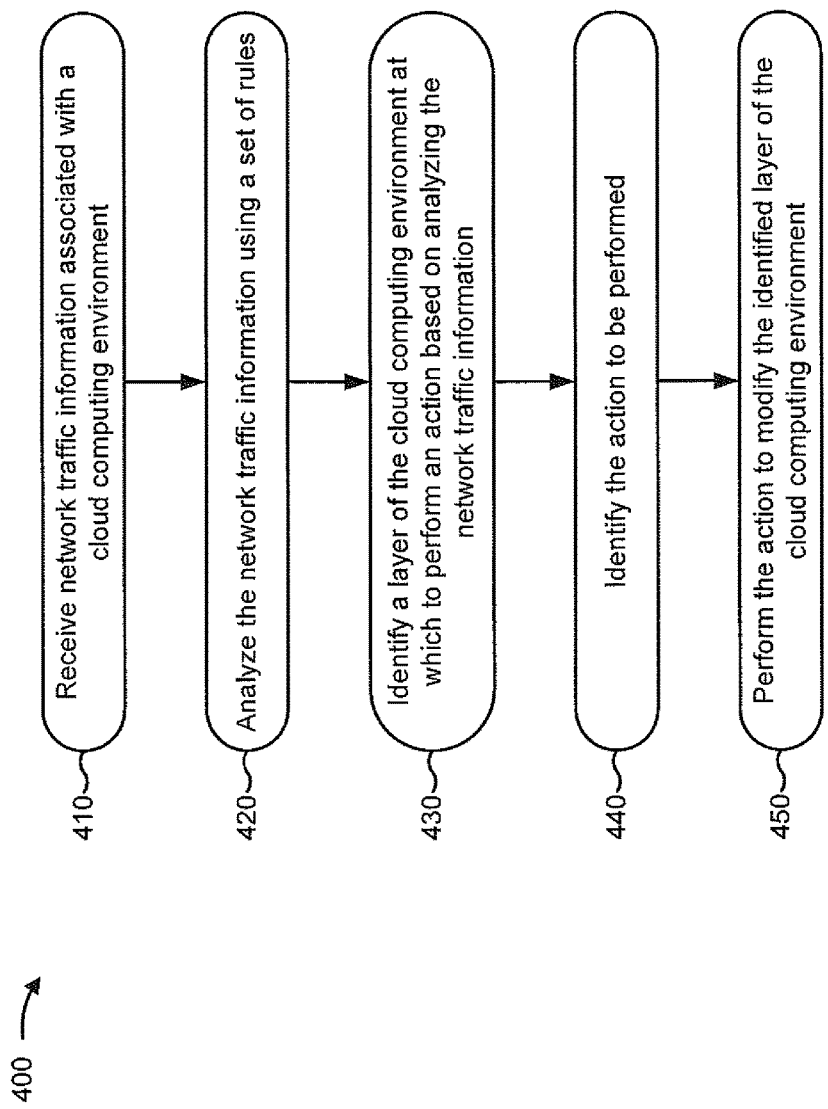
FIG. 4 is a flow chart of an example process for analyzing network traffic for layer-specific corrective actions in a cloud computing environment.

FIG. 4 is a flow chart of an example process 400 for analyzing network traffic for layer-specific corrective actions in a cloud computing environment. In some implementations, one or more process blocks of FIG. 4 may be performed by analysis device 240. Additionally, or alternatively, one or more process blocks of FIG. 4 may be performed by another device or a group of devices separate from or including analysis device 240, such as user device 210, computing resource 230, traffic monitoring device 250, and/or aggregation device 260.

As shown in FIG. 4, process 400 may include receiving network traffic information associated with a cloud computing environment (block 410). For example, analysis device 240 may receive, from one or more traffic monitoring devices 250, network traffic information associated with cloud computing environment 220. For example, traffic monitoring devices 250 may monitor network traffic received from and/or destined for cloud computing environment 220, and may generate and/or provide network traffic information based on monitoring the network traffic.

Network traffic information may include identifying information associated with network traffic (e.g., a user identifier, a device identifier, a traffic flow identifier, a packet identifier, a service identifier, a source device identifier, a destination device identifier, etc.). Additionally, or alternatively, network traffic information may include time information associated with the network traffic (e.g., information identifying a date and/or a time at which the traffic was transmitted or received, etc.).

In some implementations, traffic monitoring device 250 may inspect one or more packets (e.g., associated with one or more traffic flows), and may provide network traffic information based on the inspection. For example, the network traffic information may include information identifying a source network address, a source port, a destination network address, a destination port, a protocol, a payload, a quality of service parameter, a content type, an application, etc., associated with a packet. Additionally, or alternatively, traffic monitoring device 250 may log information and/or events associated with network traffic, and may provide network traffic information based on these logs. For example, the network traffic information may include an authentication log, an error log, a system log, a login log, logs from different traffic monitoring devices 250, etc.

Traffic monitoring device 250 may provide the network traffic information to aggregation device 260, in some implementations. Aggregation device 260 may format the network traffic information using a standard format (e.g., readable by analysis device 240). For example, aggregation device 260 may receive network traffic information from different traffic monitoring devices 250 that format network traffic information in a different manner, and may format the received network traffic information such that the network traffic information is formatted in the same manner. Aggregation device 260 may aggregate network traffic information from multiple traffic monitoring devices 250, and may provide the aggregated network traffic information (e.g., formatted or unformatted) to analysis device 240. Aggregation device 260 may aggregate network traffic information received from traffic monitoring devices 250 located external from cloud computing environment 220 (e.g., a router external to cloud computing device 220), received from traffic monitoring devices 250 located internal to cloud computing environment 220 (e.g., computing resource 230, such as application 232, virtual machine 234, virtualized storage 236, hypervisor 238, etc.), or received from a combination of traffic monitoring devices 250 located external from and internal to cloud computing environment 220.

As further shown in FIG. 4, process 400 may include analyzing the network traffic information using a set of rules (block 420), and identifying a layer of the cloud computing environment at which to perform an action based on analyzing the network traffic information (block 430). For example, analysis device 240 may analyze the network traffic information using a set of rules received via user input and/or from another device. The set of rules may identify one or more conditions that, when satisfied by the network traffic information, cause a particular action to be performed. Additionally, or alternatively, the set of rules may identify the particular action to be performed when the one or more conditions are satisfied.

In some implementations, the set of rules may identify a layer of the cloud computing environment at which to perform the action. A layer may refer to, for example, an abstraction layer, of cloud computing environment 220, associated with a particular set of functionality.

For example, a layer may include an application layer (e.g., for modifying application 232), a virtual machine layer (e.g., for modifying virtual machine 234), a virtualized storage layer (e.g., for modifying virtualized storage 236), a hypervisor layer (e.g., for modifying hypervisor 238), a network layer (e.g., for modifying a network perimeter and/or a gateway via which traffic associated with cloud computing device 220 enters or exits), a cloud portal layer (e.g., for modifying user access to cloud computing environment 220 via a user interface, such as a browser), a virtual machine interface layer (e.g., for modifying user access to one or more virtual machines 234, associated with the user, via a user interface), a cloud application programming interface (API) layer (e.g., for modifying a service port for sending secure messages to and/or receiving secure messages from computing resource 230), a network processing unit layer (e.g., for modifying characteristics of a network processing unit used to process information associated with cloud computing environment 220), an orchestration layer (e.g., for modifying a manner in which information is communicated throughout cloud computing environment 220), a hardware layer (e.g., for modifying characteristics and/or assignments of hardware associated with cloud computing environment 220), etc.

Analysis device 240 may identify one or more of these layers at which to perform a particular action. For example, the set of rules may indicate a set of layers at which a set of actions are to be performed based on a set of conditions being satisfied. Analysis device 240 may identify the set of layers and the set of actions based on the set of rules.

As further shown in FIG. 4, process 400 may include identifying the action to be performed (block 440), and performing the action to modify the identified layer of the cloud computing environment (block 450). For example, analysis device 240 may identify, using the set of rules, an action to be performed, and may cause the action to be performed. For example, the action may include modifying a configuration (e.g., a hardware configuration, a firmware configuration, a software configuration, etc.) associated with a particular layer of cloud computing environment 220. In some implementations, analysis device 240 may perform the action by sending instructions to a device that cause the device to perform the action (e.g., to modify the configuration). Analysis device 240 may identify the device, to which the instruction is to be sent, based on the identified layer. Additionally, or alternatively, analysis device 240 may perform the action by logging information, such as information associated with another performed action (e.g., information identifying an action that was taken, information identifying when the action was taken, information identifying the layer, information identifying a device to which an instruction was sent, etc.).

As an example, when an attack is detected on cloud computing environment 220 rather than an individual computing resource 230 of cloud computing environment 220, analysis device 240 may perform an action at a network layer (e.g., an environment layer), such as blocking access to cloud computing environment 220, slowing down traffic to cloud computing environment 220 from a source of the attack, etc. As another example, when an attack is detected on computing resource 230 rather than cloud computing environment 220, analysis device 240 may perform an action at a computing resource layer (e.g., a virtual machine layer, a hypervisor layer, etc.), such as blocking access to computing resource 230 (e.g., when computing resource 230 is determined to be compromised), slowing down traffic destined for computing resource 230, etc.

As another example, analysis device 240 may modify an application layer by sending instructions to permit or deny access to application 232 (e.g., by all users, by a set of users, by a particular user, etc.), to modify a quality of service parameter for network traffic associated with application 232 (e.g., a bandwidth for the traffic, a quantity of permitted input and/or output operations for the traffic, a priority level for the traffic, etc.), etc. As another example, analysis device 240 may modify a virtual machine layer by sending instructions to permit or deny access to virtual machine 234, to modify a quality of service parameter for virtual machine 234, to turn virtual machine 234 on or off, to reallocate virtual machine 234 (e.g., to a different user, function, etc.), to modify a configuration of virtual machine 234 (e.g., an operating system executing on virtual machine 234, a set of applications installed on virtual machine 234, access permissions associated with virtual machine 234, etc.), to block access to a first port of virtual machine 234 (e.g., a port connected to the Internet) and permit access via a second port of virtual machine 234 (e.g., a console port that permits a customer to access virtual machine 234), etc.

As another example, analysis device 240 may modify a virtualized storage layer by sending instructions to permit or deny access to virtualized storage 236, to modify a quality of service parameter associated with virtualized storage 236, to turn virtualized storage 236 on or off, to reallocate virtualized storage 236, to modify a configuration of virtualized storage 236 (e.g., a storage structure, a partition, etc.), etc. As another example, analysis device 240 may modify a hypervisor layer by sending instructions to permit or deny access to hypervisor 238, to modify a quality of service parameter for hypervisor 238, to turn hypervisor 238 on or off, to reallocate hypervisor 238 (e.g., to a different user, function, etc.), to modify a configuration of hypervisor 238 (e.g., a set of guest operating systems available to hypervisor 238, parameters for switching between the guest operating systems, access permissions associated with hypervisor 238, etc.), to block access to a first port of hypervisor 238 and permit access via a second port of hypervisor 238, etc.

As another example, analysis device 240 may modify a network layer by sending instructions to permit or deny access to cloud computing environment 220 (e.g., via a cloud computing gateway), to modify a quality of service parameter for cloud computing environment 220, to modify traffic monitoring associated with cloud computing environment 220 (e.g., to identify network traffic to be monitored, to identify network traffic for which monitoring is to be prevented, to identify network traffic to be mirrored, to identify network traffic to be rerouted to a honey pot for intrusion detection, to take a snapshot that stores information identifying the state of computing resource 230 at a particular time, etc.), etc. As another example, analysis device 240 may modify a cloud portal layer by sending instructions to permit or deny access cloud computing environment 220 via a particular interface (e.g., a browser-based user interface), to modify security settings associated with cloud computing environment 220 via the particular interface (e.g., to modify an authentication credential, to increase or decrease a quantity of credentials required to access to cloud computing environment 220, to turn multi-factor authentication on or off, etc.), etc.

As another example, analysis device 240 may modify a virtual machine interface layer by sending instructions to permit or deny access to virtual machine 234 via a particular interface (e.g., a browser-based user interface), to modify security settings associated with virtual machine 234 via the particular interface (e.g., to modify an authentication credential, to increase or decrease a quantity of credentials required to access virtual machine 234, to turn multi-factor authentication on or off, etc.), etc. As another example, analysis device 240 may modify a cloud API layer by sending instructions to permit or deny access to computing resource 230 via a particular interface (e.g., a service port for communicating secure messages with computing resource 230), to modify security settings associated with computing resource 230 via the particular interface (e.g., change a hashing algorithm used to create secure messages, to turn secure messaging on or off, for changing a service port used for the secure messages, etc.), etc.

As another example, analysis device 240 may modify a network processing unit layer by sending instructions to modify a configuration associated with processing information in cloud computing environment 220 (e.g., to speed up or slow down the processing of information, to modify a traffic transfer rate for network traffic within cloud computing environment 220, etc.), to modify a processing speed of particular network traffic (e.g., to speed up or slow down the processing speed associated with particular network traffic), etc. As another example, analysis device 240 may modify an orchestration layer by sending instructions to modify a configuration associated with communicating information throughout cloud computing environment 220 (e.g., to modify a security level of communications, to modify a protocol used for communications, to modify a bandwidth allocated to communications, etc.). As another example, analysis device 240 may modify a hardware layer by sending instructions to modify a configuration of one or more hardware components associated with cloud computing environment 220 (e.g., to reassign hardware to a different user, to reassign hardware to a different function, etc.).

In some implementations, analysis device 240 may perform the action by creating an intrusion detection signature (e.g., an attack signature), and providing the attack signature to traffic monitoring device 250 to apply the attack signature to network traffic (e.g., to notify analysis device 240 of suspicious network traffic detected by applying the attack signature). Additionally, or alternatively, analysis device 240 may perform the action by creating a new set of rules, and may store the new set of rules to be applied to network traffic information.

In some implementations, analysis device 240 may verify that the action was performed (e.g., by checking a log, by requesting verification information from a device to which an instruction was sent, by requesting verification information from another device, etc.). In this way, a service provider may exercise fine-grained control over modifications made to cloud computing environment 220 based on network traffic.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
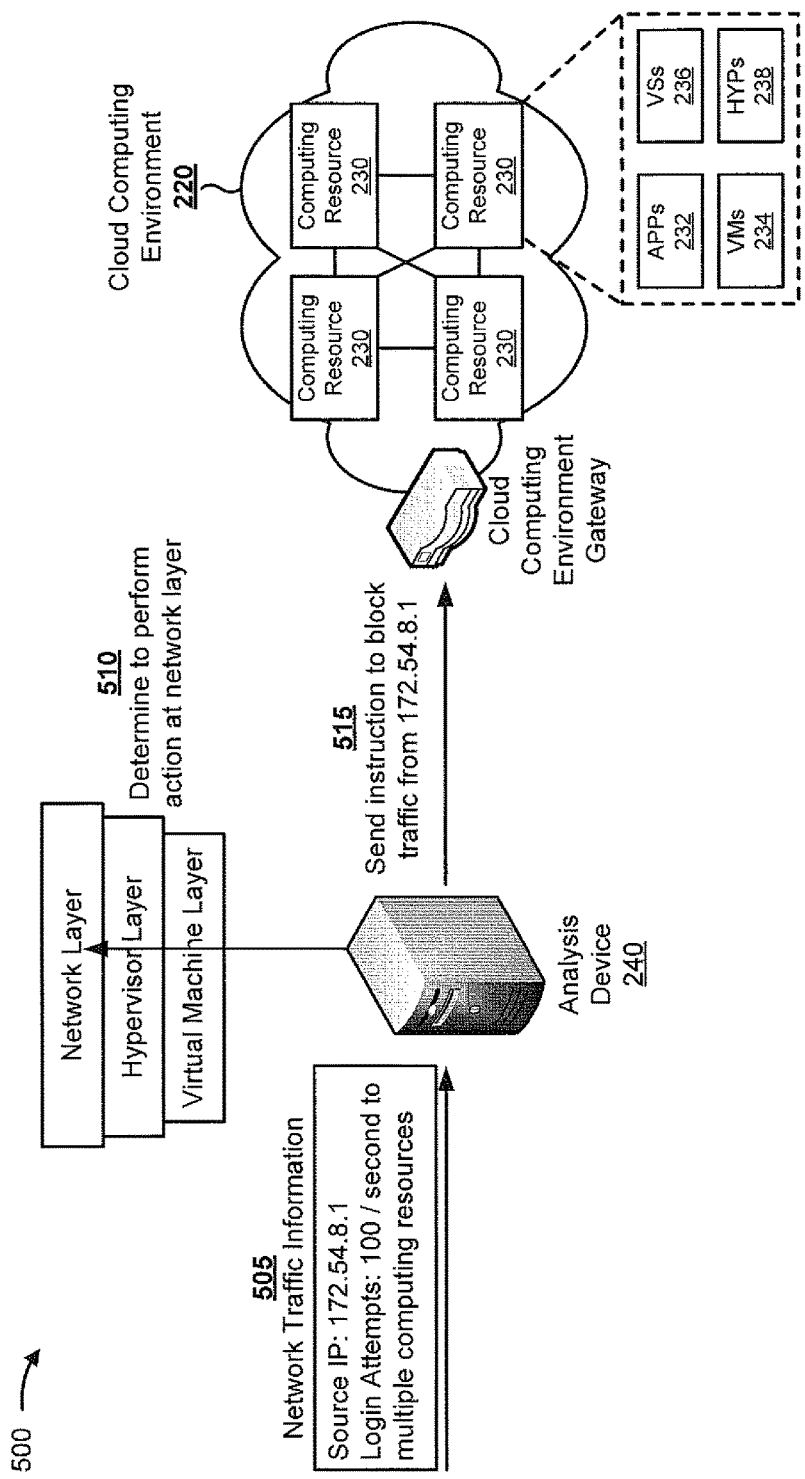
FIGS. 5A and 5B are diagrams of an example implementation relating to the example process shown in FIG. 4.
Figure 5B:
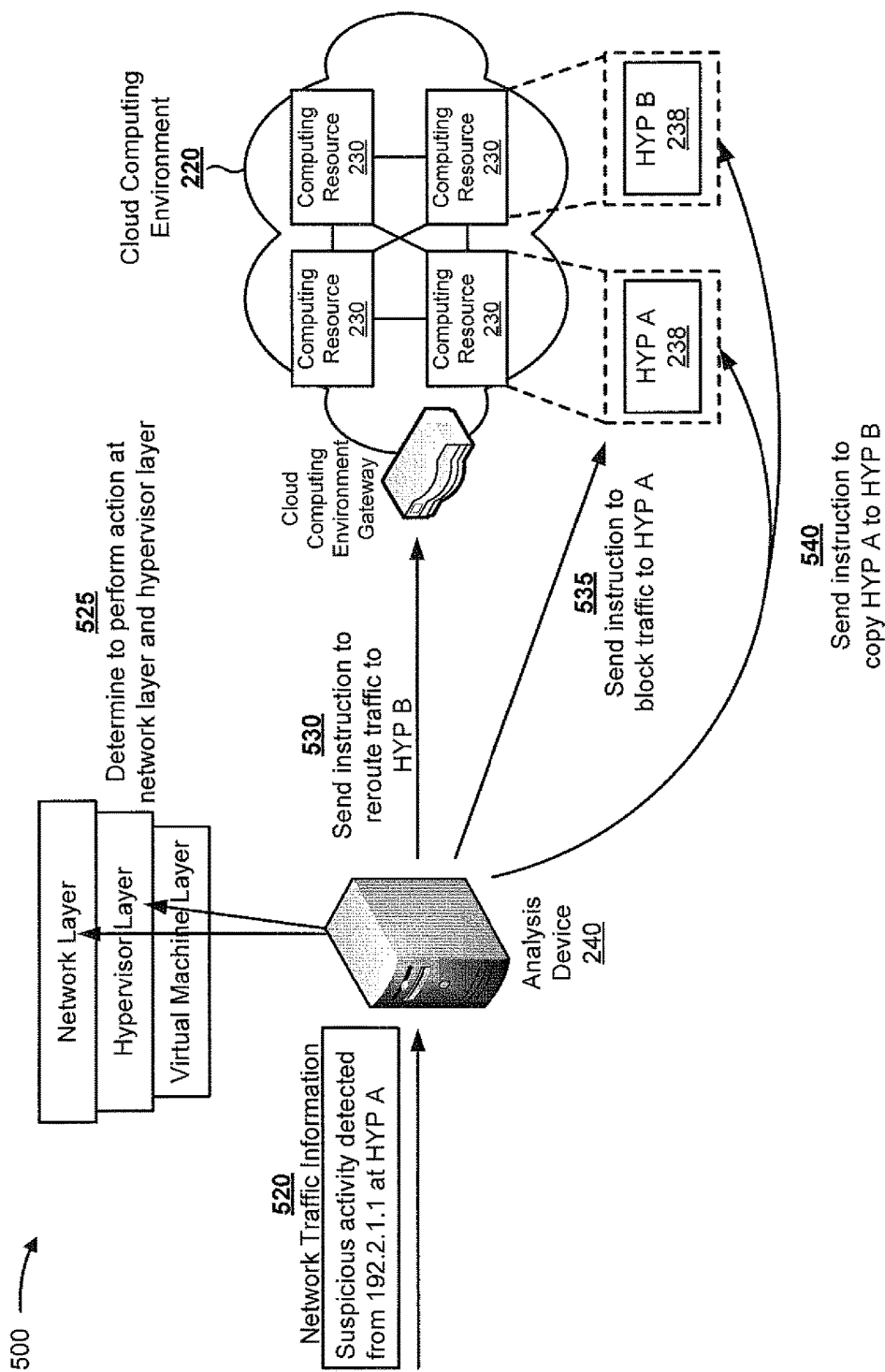

FIGS. 5A and 5B are diagrams of an example implementation 500 relating to example process 400 shown in FIG. 4. FIGS. 5A and 5B show an example of analyzing network traffic for layer-specific corrective actions in a cloud computing environment.

As shown in FIG. 5A, and by reference number 505, assume that analysis device 240 receives network traffic information (e.g., from one or more traffic monitoring devices 250 and/or aggregation devices 260). As shown, assume that the network traffic information indicates that a device associated with a source IP address of 172.54.8.1 attempted 100 logins per second into different computing resources 230 of cloud computing environment 220. As shown by reference number 510, assume that analysis device 240 uses a set of rules to determine that when a threshold number of logins are attempted from a particular source IP address (e.g., greater than 50 login attempts per second) and when the login attempts are associated with multiple computing resources 230 (e.g., associated with different customers), an action is to be performed at the network layer. Further, assume that the set of rules identifies an action to block traffic (e.g., packets) from the particular source IP address.

As shown by reference number 515, based on the identified network layer and the identified action, assume that analysis device 240 sends, to a cloud computing environment gateway that manages traffic to and from cloud computing device 220, an instruction to block traffic from the IP address of 172.54.8.1. In this way, a service provider may stop a widespread attack on different computing resources 230 by blocking, from the entire cloud computing environment 220, traffic from the IP address of 172.54.8.1.

As shown in FIG. 5B, and by reference number 520, assume that analysis device 240 receives different network traffic information (e.g., from one or more traffic monitoring devices 250 and/or aggregation devices 260). As shown, assume that the network traffic information indicates that suspicious activity, associated with a source IP address of 192.2.1.1, has been detected in association with hypervisor A (HYP A). As shown by reference number 525, assume that analysis device 240 uses a set of rules to determine that when suspicious activity is detected in association with a particular hypervisor, an action is to be performed at the network layer and the hypervisor layer. Further, assume that the set of rules identifies three actions, described below.

As shown by reference number 530, assume that analysis device 240 performs a first action, at the network layer, by sending an instruction, to the cloud computing environment gateway, to reroute traffic, intended for HYP A, to hypervisor B (HYP B). Assume that HYP B executes an intrusion detection environment (e.g., a honey pot environment) to analyze suspicious traffic. As shown by reference number 535, assume that analysis device 240 performs a second action, at the hypervisor layer, by sending an instruction, to HYP A, to block incoming traffic. As shown by reference number 540, assume that analysis device 240 performs a third action, at the hypervisor layer, by sending an instruction, to HYP A and HYP B, to copy the contents of HYP A to HYP B. In this way, HYP B may simulate the environment of HYP A, and may perform intrusion detection operations on incoming traffic from 192.2.1.1, which will be routed to HYP B by the cloud computing environment gateway. In this way, a service provider may make modifications at different network layers to address different network traffic issues in a different manner.

As indicated above, FIGS. 5A and 5B are provided merely as examples. Other examples are possible and may differ from what was described with regard to FIGS. 5A and 5B.

Implementations described herein assist a service provider in modifying a cloud computing environment at a specific layer based on monitoring network traffic associated with the cloud computing environment. In this way, the service provider may achieve fine-grained control of the cloud computing environment.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An analysis device, comprising:
one or more processors to:
receive information that identifies a set of rules for analyzing network traffic associated with a cloud computing environment,
the set of rules identifying a threshold number of login attempts from a particular IP address, and
the set of rules identifying a set of layers of the cloud computing environment at which to perform a set of actions based on one or more conditions being satisfied,
the set of layers including a plurality of layers;
receive network traffic information associated with the cloud computing environment,
the network traffic information being associated with network traffic transmitted to or transmitted from the cloud computing environment;
analyze the network traffic information using the set of rules;
identify a particular layer, of the set of layers, that satisfies the one or more conditions based on analyzing the network traffic information using the set of rules; and
cause the set of actions to be performed,
the set of actions including:
a denial of access to a particular resource of the particular layer based on the particular layer satisfying the one or more conditions, and a permission of access to one or more other layers of the set of layers.

2. The analysis device of claim 1, where the one or more processors are further to:
identify one or more other actions to be performed based on analyzing the network traffic information using the set of rules;
identify a respective plurality of layers, at which to perform the one or more other actions, based on analyzing the network traffic information using the set of rules; and
cause the one or more other actions to be performed to modify the respective plurality of layers.

3. The analysis device of claim 1, where the network traffic information includes:
first network traffic information provided by a first traffic monitoring device located internal to the cloud computing environment; and
second network traffic information provided by a second traffic monitoring device located external to the cloud computing environment,
the second network traffic information being different from the first network traffic information.

4. The analysis device of claim 1, where the one or more processors, when causing the set of actions to be performed, are to:
send an instruction, to a device associated with the particular layer, to perform one or more of the set of actions.

5. The analysis device of claim 1, where the particular layer is a network layer; and
where the one or more processors are further to:
send an instruction, to a device associated with the network layer, to modify traffic monitoring associated with the cloud computing environment.

6. The analysis device of claim 1, where the particular layer is a computing resource layer; and
where the one or more processors, when causing the set of actions to be performed, are to:
send an instruction, to a computing resource, to deny access to the computing resource based on the particular layer being the computing resource layer.

7. The analysis device of claim 1, where the particular layer is a network processing unit layer; and
where the one or more processors are further to:
send an instruction, to a network processing unit internal to the cloud computing environment and associated with the network processing unit layer, to modify a traffic transfer rate of network traffic within the cloud computing environment.

8. A non-transitory computer-readable medium storing instructions, the instructions comprising:
one or more instructions that, when executed by one or more processors, cause the one or more processors to:
receive information that identifies a set of rules for analyzing network traffic associated with a cloud computing environment,
the set of rules identifying a threshold number of login attempts from a particular IP address, and
the set of rules identifying a set of layers of the cloud computing environment at which to perform a set of actions based on one or more conditions being satisfied,
the set of layers including a plurality of layers;
receive network traffic information associated with the cloud computing environment,
the network traffic information being associated with network traffic transmitted to or transmitted from the cloud computing environment;
analyze the network traffic information using the set of rules;
identify a particular layer, of the set of layers, that satisfies the one or more conditions based on analyzing the network traffic information using the set of rules; and
cause the set of actions to be performed,
the set of actions including:
a denial of access to a particular resource of the particular layer based on the particular layer satisfying the one or more conditions, and
a permission of access to one or more other layers of the set of layers.

9. The non-transitory computer-readable medium of claim 8, where the one or more instructions further cause the one or more processors to:
identify one or more other actions to be performed based on analyzing the network traffic information using the set of rules;
identify a respective plurality of layers, at which to perform the one or more other actions, based on analyzing the network traffic information using the set of rules; and
cause the one or more other actions to be performed to modify a respective plurality of configurations associated with the respective plurality of layers of the cloud computing environment.

10. The non-transitory computer-readable medium of claim 8, where the network traffic information includes:
first network traffic information generated by or received from a first traffic monitoring device located internal to the cloud computing environment; and
second network traffic information generated by or received from a second traffic monitoring device located external to the cloud computing environment,
the second network traffic information being different from the first network traffic information.

11. The non-transitory computer-readable medium of claim 8, where the one or more instructions, that cause the one or more processors to cause the set of actions to be performed, cause the one or more processors to:
send an instruction, to a device associated with the particular layer, to perform one or more of the set of actions.

12. The non-transitory computer-readable medium of claim 8, where the one or more instructions, when executed by the one or more processors, further cause the one or more processors to:
send an instruction to modify a quality of service parameter used to handle network traffic associated with the cloud computing environment.

13. The non-transitory computer-readable medium of claim 8, where the particular layer is a hypervisor layer; and
where the one or more instructions, that cause the one or more processors to cause the set of actions to be performed, cause the one or more processors to:
send an instruction, to a hypervisor and the hypervisor layer, to perform one or more of the set of actions.

14. The non-transitory computer-readable medium of claim 8, where the particular layer is a virtual machine layer; and
where the one or more instructions, that cause the one or more processors to cause the set of actions to be performed, cause the one or more processors to:

send an instruction, to a virtual machine and the virtual machine layer, to perform one or more of the set of actions.

15. A method, comprising:

receiving, by an analysis device, information that identifies a set of rules for analyzing network traffic associated with a cloud computing environment,
   the set of rules identifying a threshold number of login attempts from a particular device, and
   the set of rules identifying a set of layers of the cloud computing environment at which to perform one or more actions based on one or more conditions being satisfied,
   the set of layers including a plurality of layers;

receiving, by the analysis device, network traffic information associated with the cloud computing environment,
   the network traffic information being associated with network traffic transmitted to or transmitted from the cloud computing environment;

analyzing, by the analysis device, the network traffic information using the set of rules;

identifying, by the analysis device, a particular layer, of the set of layers, that satisfies the one or more conditions based on analyzing the network traffic information using the set of rules; and causing, by the analysis device, the one or more actions to be performed,
   the one or more actions including at least one of:
      a denial of access to a particular resource of the particular layer based on the particular layer satisfying the one or more conditions, and
      a permission of access to one or more other layers of the set of layers.

16. The method of claim 15, further comprising:

identifying the one or more actions to be performed based on analyzing the network traffic information using the set of rules,
where identifying the particular layer comprises:
   identifying a respective plurality of layers, at which to perform the one or more actions, based on analyzing the network traffic information using the set of rules,
      the respective plurality of layers including the particular layer; and
where causing the one or more actions to be performed comprises:
   causing the one or more actions to be performed to modify a respective plurality of configurations associated with the respective plurality of layers of the cloud computing environment.

17. The method of claim 15, where the network traffic information includes:

first network traffic information provided by a first traffic monitoring device located internal to the cloud computing environment; and second network traffic information provided by a second traffic monitoring device located external to the cloud computing environment,
   the second network traffic information being different from the first network traffic information.

18. The method of claim 15, where causing the one or more actions to be performed comprises:

sending an instruction, to a device associated with the particular layer, to cause the one or more actions to be performed.

19. The method of claim 15, further comprising:

generating an intrusion detection signature to be used to monitor network traffic; and providing the intrusion detection signature to a traffic monitoring device,
   the traffic monitoring device using the intrusion detection signature to monitor network traffic.

20. The method of claim 15, further comprising:

generating a new set of rules to be used to analyze network traffic;

receiving other network traffic information associated with the cloud computing environment; and analyzing the other network traffic information using the new set of rules.

* * * * *